April 19, 1966  T. J. PAISLEY  3,246,444
METHOD OF FORMING A CONTAINER HAVING A SHAKER OUTLET
Filed Aug. 9, 1962  5 Sheets-Sheet 1
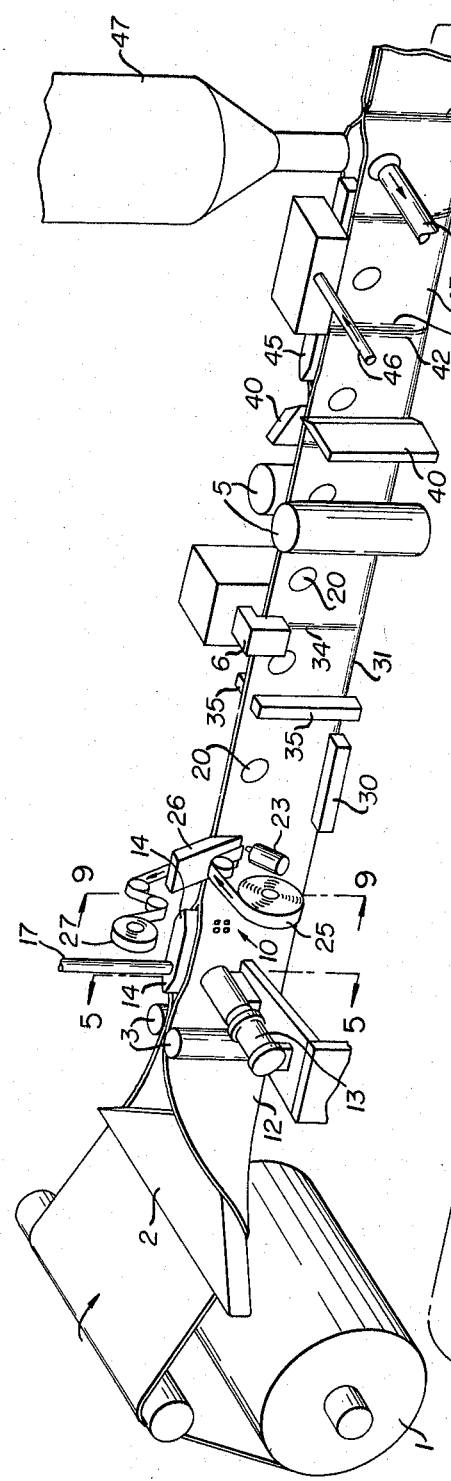
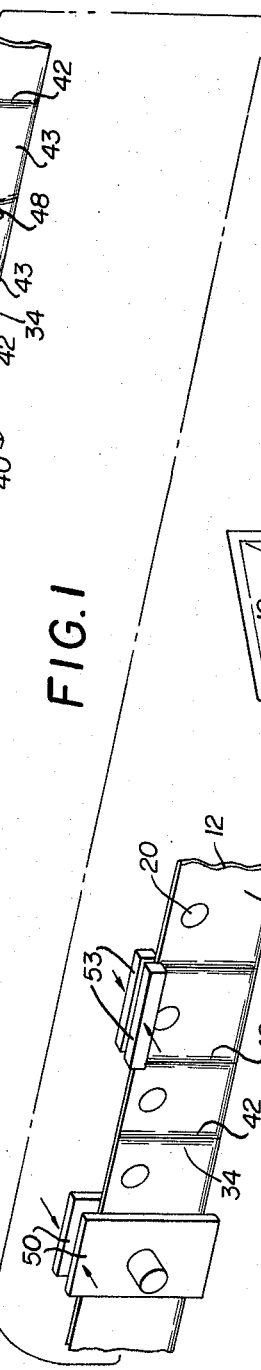
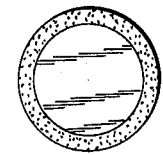
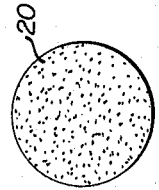
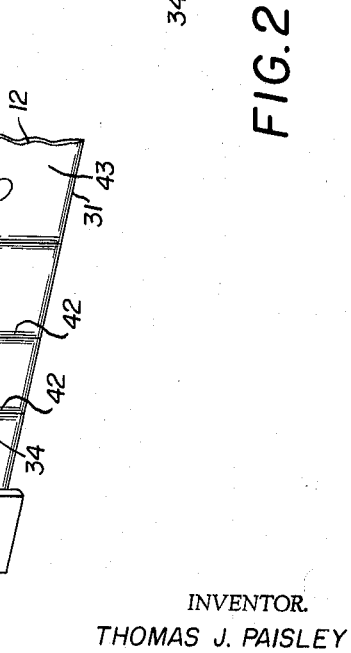
INVENTOR.
THOMAS J. PAISLEY
BY
ATTORNEY April 19, 1966   T. J. PAISLEY   3,246,444
METHOD OF FORMING A CONTAINER HAVING A SHAKER OUTLET
Filed Aug. 9, 1962   5 Sheets-Sheet 2
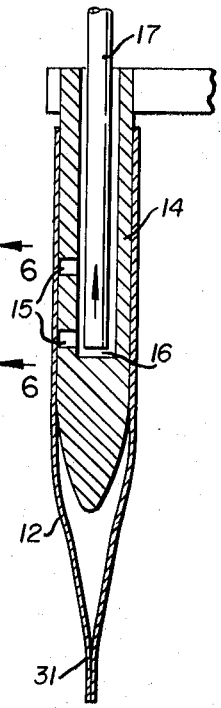
FIG. 5
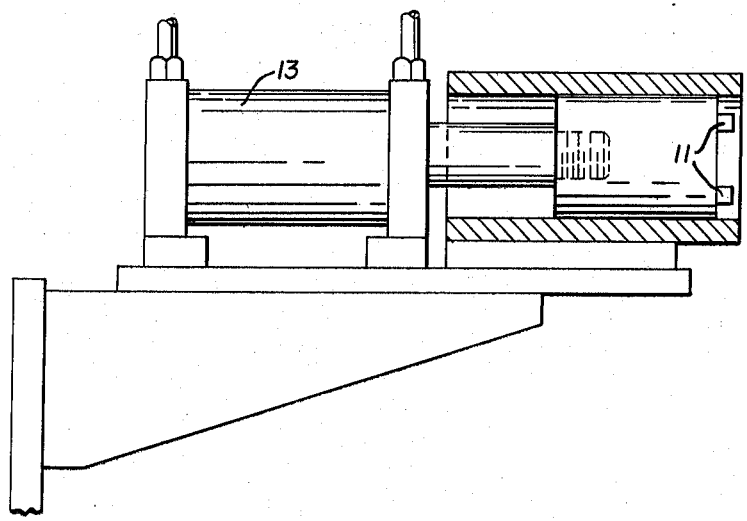
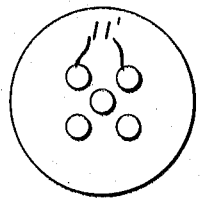  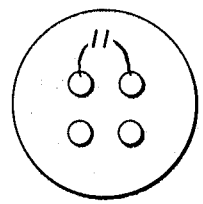
FIG. 7   FIG. 6
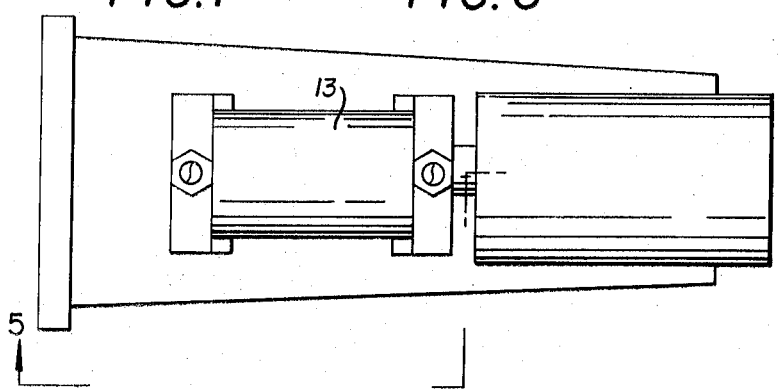
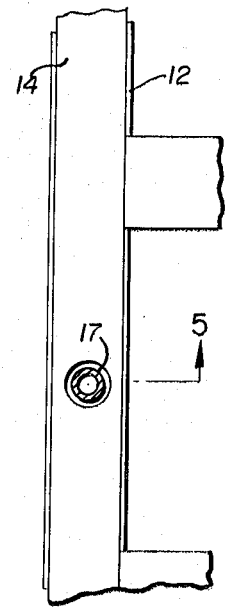
FIG. 8
INVENTOR.
THOMAS J. PAISLEY
BY
Gordon C. Clark
ATTORNEY April 19, 1966     T. J. PAISLEY     3,246,444
METHOD OF FORMING A CONTAINER HAVING A SHAKER OUTLET
Filed Aug. 9, 1962     5 Sheets-Sheet 3

INVENTOR.
THOMAS J. PAISLEY
BY
ATTORNEY

April 19, 1966     T. J. PAISLEY     3,246,444
METHOD OF FORMING A CONTAINER HAVING A SHAKER OUTLET
Filed Aug. 9, 1962

INVENTOR.
THOMAS J. PAISLEY
BY
ATTORNEY

April 19, 1966   T. J. PAISLEY   3,246,444
METHOD OF FORMING A CONTAINER HAVING A SHAKER OUTLET
Filed Aug. 9, 1962   5 Sheets-Sheet 5

INVENTOR.
THOMAS J. PAISLEY
BY
ATTORNEY

United States Patent Office 3,246,444
Patented Apr. 19, 1966

3,246,444
METHOD OF FORMING A CONTAINER HAVING
A SHAKER OUTLET
Thomas J. Paisley, Medina, Ohio; The Old Phoenix National Bank, executor of estate of said Thomas J. Paisley, deceased, assignor to The T. J. Paisley Company, Medina, Ohio, a corporation of Ohio
Filed Aug. 9, 1962, Ser. No. 215,882
2 Claims. (Cl. 53—28)

This invention relates to a package of pourable material, which may be granular, which may be of powder fineness or somewhat larger, in a flexible container. The container is provided with one or more perforations for dispensing the pourable material, and these are covered by a tab adhered to the container with pressure-sensitive adhesive. The tab can be removed for dispensing the contents of the container through the one or more perforations, and may be readhered to the container and removed again from time to time as required, until the container is empty. The invention includes both the package and the method of producing it.

The container is usually small, measuring no more than several inches in each direction, and is designed for various uses. For example, it may be used in give-away packages, such as samples of soaps, detergents, cleaning materials, etc., or foodstuffs such as seasoning materials, ground nut meats, etc. Also it may be used for packages of materials which are offered for sale, such as medicines, food-coloring and decorating materials, etc. It may be used for packaging materials all of which are to be used at one time such as, for example, sugar or the like placed on customers' trays at restanurants, etc., or for materials only a part of which is to be used at one time—the tab to be replaced after each such use until the package is empty. It is to be understood that the container is flexible and suitable for packaging any pourable material capable of being dispensed through a shaker opening, whether in small amounts from time to time or all at once, and the composition of the packaging material, the size of the package and the size and number of openings for dispensing the material are dictated by all of the circumstances.

The package is relatively flat, being made from an envelope or pillow-like container, and is generally rectangular in outline although the seals across the top and bottom of the pillow-like container may be perfectly straight or they may be plicated. The number and size of the perforations and their arrangement is not critical. If the contents of the package are to be spread over a wide area, the one or more perforations may be arranged in an elongated area. Ordinarily, however, they will be gathered together in a small area so as to deliver a concentrated stream of the packaged material. The tab may be of any desired shape. It may be of any desired color and may bear any desired insignia. Pressure-sensitive adhesive may cover all of one surface of the tab or only the rim of the tab may be covered with adhesive so that the adhesive does not come directly in contact with the contents of the package.

As will be evident to the man skilled in the art, the equipment necessary for perforating and placing a tab on a package is readily adapted to known packaging equipment, and because the essential elements, and to some extent the combinations of elements of the packaging equipment, are of types well known, the equipment is shown somewhat diagrammatically. The device for applying the tabs may be that used for applying price tabs to imperforate containers or packages. Any suitable equipment for coordinating the various operations can be used.

The invention is illustrated in the accompanying drawings, in which:

FIGURE 1 is a diagrammatic showing of the equipment for making an envelope package;

FIGURE 2 is a view of the finished package made by such equipment;

FIGURE 3 is a back view of a tab covered with pressure-sensitive adhesive;

FIGURE 4 is a back view of a tab in which only the rim is covered with pressure-sensitive adhesive;

FIGURE 5 is a section of the lines 5—5 of FIGURES 1 and 8 showing the means for perforating the envelopes;

FIGURE 6 is an end view of the perforating die on the line 6—6 of FIGURE 5;

FIGURE 7 is the end view of an alternative perforating die;

FIGURE 8 is a plan view of the equipment shown in FIGURE 5;

Figure 9:
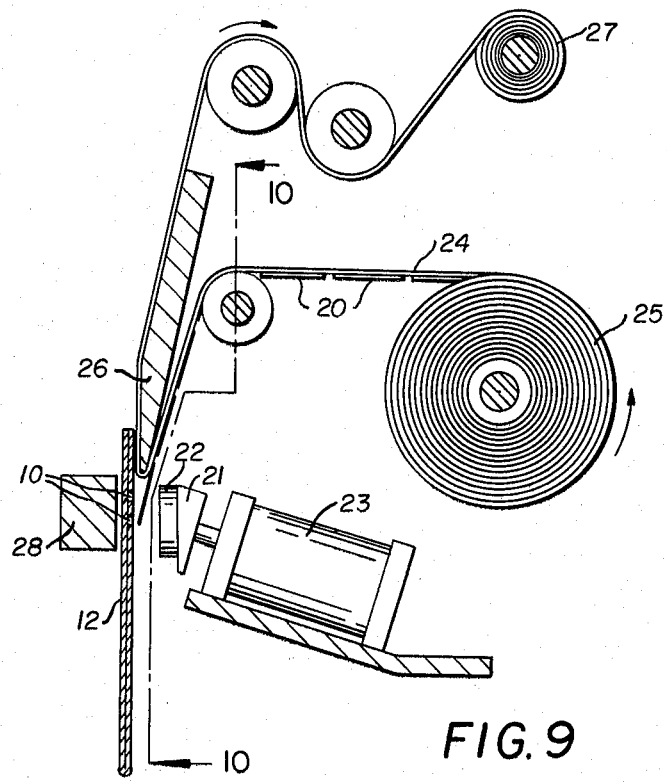
FIGURE 9 is a side view of the tab-applying equipment.

The roll stock from which the containers are made will be referred to herein as heat-sealable flexible packaging material, usually being a film laminate, although it may be a coated cellulosic paper, film, foil or the like, one surface of the material (whether a laminate or a coated sheet) being heat sealable so that by the application of heat and pressure two surfaces can be united both in forming the container and also in the final sealing of the package.

FIGURE 1 illustrates one form of usual equipment for the manufacture of envelope containers and filling and sealing the same. The packaging material may, for example, be foil, paper, cellophane, etc. to which a heat-sealable material (for example, polyethylene, rubber hydrochloride, etc.) has been laminated. Taken from the roll 1, it is doubled over around the plate 2 with the heat-sealable surfaces adjacent each other, and the resulting opposite halves of the sheet are brought together by the rollers 3 which form a crease down the middle of the sheet. The rollers 5 apply pressure to the opposite surfaces of the folded sheet and by rotating intermittently impart an intermittent motion to the folded sheet which is controlled by the electric eye 6 in conjunction with the registering mark (not shown) on the sheet. Thus, as the sheet is moved from left to right it stops long enough at the different stations for completion of the different operations which will not be described.

At the first station the perforations 10 are formed by the cutter projections 11 on the die head which is moved through and then away from the folded sheet 12 by the air cylinder 13 as the opposite halves of the sheet pass over the plate 14 which is provided with perforations 15 to receive the projections 11. The cut-outs fall to the bottom of the recess 16 and are removed by vacuum through the pipe 17. The reciprocation of the die is coordinated with the movement of the sheet, so that each time it comes to a stop, a new set of perforations is punched into it.

The arrangement of the perforations is not critical. FIGURE 7 shows a die head with projections 11' arranged somewhat differently from those in the other figures.

Figure 10:
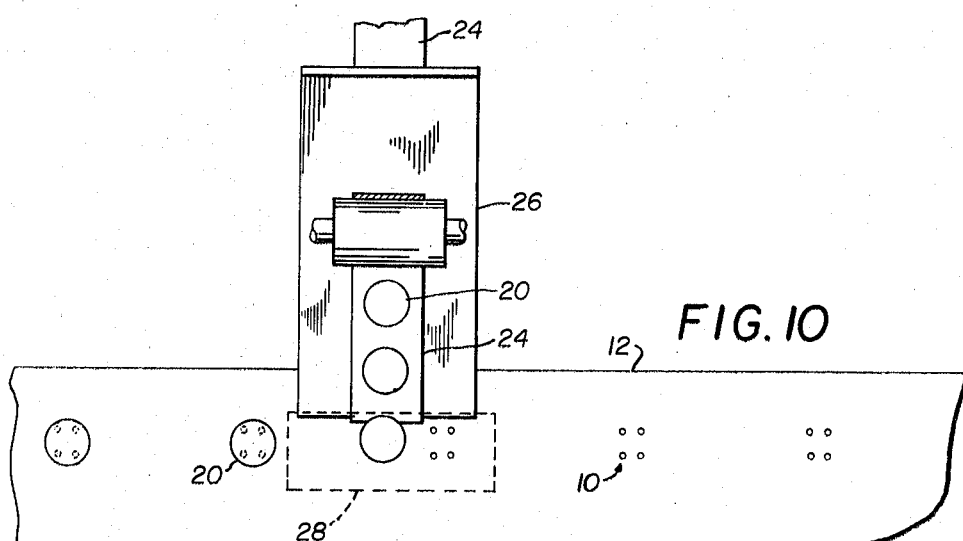
FIGURE 10 is a side elevation of part of the same on the line 10—10 of FIGURE 9.

At a subsequent station (reached the second time the sheet stops, as depicted in the drawing) each series of perforations is covered with a tab 20. One entire surface of this tab 20 is covered with pressure-sensitive adhesive (FIGURE 3). Alternatively (FIGURE 4) only the rim of the tab is covered with the adhesive so that it does not come into contact with the contents of the package. FIGURES 9 and 10 show diagrammatically the use of standard labelling equipment for this purpose. The plunger 21 is covered with a sponge 22. Each time the movement of the folded sheet 12 is interrupted, the plunger is moved toward it by the air cylinder 23. The tabs 20 are adhered to the waxed paper strip 24 on the roll 25 by the pressure-sensitive adhesive. The waxed paper is bent sharply back over the blade 26, and just prior to each interruption of the movement of the sheet 12, the waxed paper is advanced toward the wind-up roll 27 just the distance to bring a new tab 20 into the path of the plunger. As the strip 24 is flexed back over the blade, the tabs (which are relatively stiff) tend to move forward and are separated almost entirely from the strip 24, but not entirely, and when each movement of the strip 24 is ended a new tab is brought into the path of the plunger as best illustrated in FIGURE 9. When the plunger is actuated it removes the strip 24 from the strip of waxed paper and presses it over the perforations 10 with the side covered by the pressure-sensitive adhesive forward, and with sufficient pressure to adhere the tab over the perforations. The back-up plate 28 holds the sheet in position.

At a subsequent station the heater bar 30 and a similar bar on the opposite side of the doubled-over sheet are brought together producing a narrow seal 31 across the bottom of the envelope. This seal is not necessary but assists in producing a flat package. In this envelope-type of package it is desirable to have the contents spread more or less uniformly over the entire inside area of the package rather than to have it bulked at the bottom or any other one place, and this seal across the bottom of the envelope assists in this. Less room is required for packaging a number of such flat packages within a container than would be required for packages in which the contents are all bulked in one part of the package.

At a subsequent station cross seams 34 are formed between the inner surfaces of the folded sheet 12 by the heated bars 35 which are pressed against opposite sides of the folded sheet. It is noted that these bars do not extend to the top edge of the package. The reason for this will be explained in what follows.

After the folded sheet 12 has passed between the rollers 5 it comes to a station at which the knives 40 cut the continuous sheet into individual packages. These knife blades 40 cut the long sheet in the middle of the seals 34, along the lines 42, into individual packages 43. These are supported by means (not shown).

Although the containers are now separated from one another, they are stiff enough so that they are retained in line with suitable guides (not shown). The cuts 42 are at the centers of the seals 34 so that each package is sealed together along each edge (FIGURE 2).

The seals 34 do not come to the top of the package, so that as the packages are moved along under the separator 45 their tops are opened. Air introduced through the pipe 46 spreads the envelopes and each is filled with a measured amount of material from the hopper 47. The air exhaust 48 removes displaced air from the packages and tends to bring the walls of the package together. At a subsequent station the plates 50 are moved toward one another and this distributes the contents of the package relatively uniformly throughout the entire interior of the container. At a subsequent station the sealing bars 53 are brought together to seal the tops of the envelopes.

Although in the foregoing we have referred only to the various elements being brought together at the different stations, it is clear that before the packaging material 12 is again put into motion the elements at each station must be separated to permit movement of the container material 12.

The finished package is then generally put into a carton manually or automatically together with many other identical packages.

When the package reaches the ultimate consumer the tab is easily removed. The contents of the package are then delivered through the perforations. If only a part of the contents are utilized, the tab may be replaced until it is desired to remove more of the contents from the package.

Figure 11:
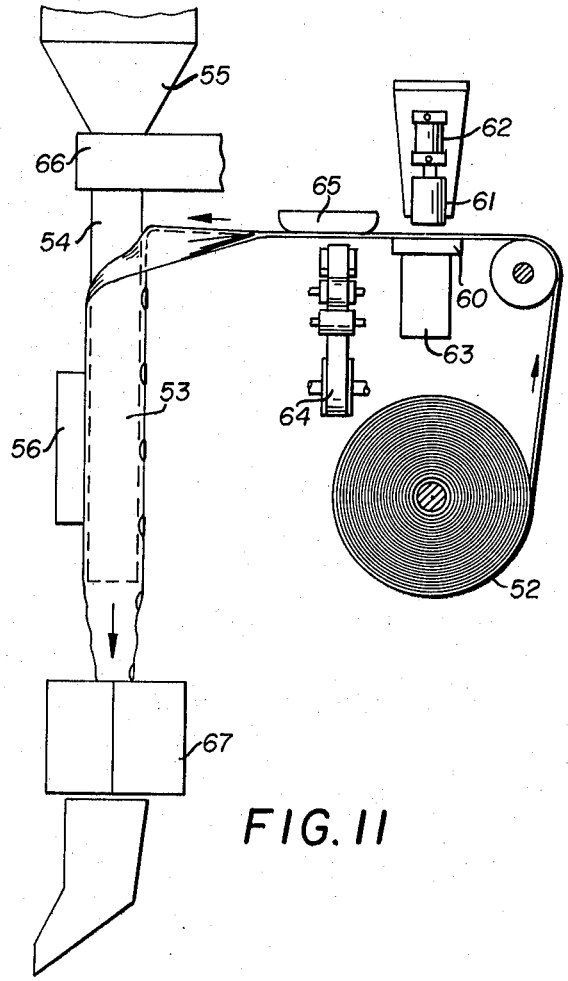
FIGURE 11 is a diagrammatic view of equipment for perforating and applying tabs to film, subsequently forming this film into a tube, filling a pourable material into the bottom of the same, and then sealing and cutting the tube into filled pillow-like containers.

FIGURE 11 shows diagrammatically, equipment for taking the sheet from the roll 52 and forming it into the tube 53 around the discharge chute 54 from the hopper 55. The two edges of the sheet are sealed by the heat sealer 56 to form the seal 57.

Between the roll 52 and the tube-forming means the sheet is perforated and the tabs are applied by means such as described. As the sheet passes over support 60 it is perforated by a die located within the housing 61, reciprocated by the air cylinder 62. The cut-outs are collected in the receiver 63, and disposed of from time to time. Next the tabs are removed from the roll 64 of waxed paper and placed over the perforations by means such as shown in FIGURES 9–10, as the sheet passes under the back-up plate 65. The various operations are coordinated by suitable means controlled by an electric eye (not shown) by means of some registering mark on the sheet.

The delivery of the contents of the hopper is controlled by the valve mechanism 66 which discharges a measured amount of the material from the hopper through the tube 54. The operation of valve means and the cut-off and sealing means 67 are coordinated with the intermittent delivery of the sheet so that parallel heated sealing bars in the means 67 are brought together to seal the two surfaces of the sheet together in a straight line above each charge of material delivered through chute 54, to seal off the tube above each charge and form a bottom in the tube to receive a fresh charge. After each sealing operation the cut-off knife separates the completed pillow-type package from the bottom of the tube, and the tube is shifted down to position the next seal at the knife to produce a new package. Means for moving the packaging material from the roll and over the chute 54 in intermittent fashion is enclosed within the mechanism 67 or separately provided, and the different operations are coordinated by any suitable means (not shown) so that each package is perforated and tabbed.

Figure 12:
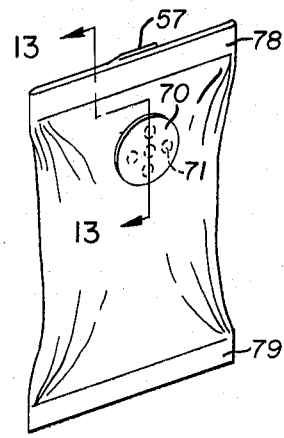
FIGURE 12 is a view in perspective of the finished package produced on the equipment illustrated in FIGURE 11.
Figure 13:
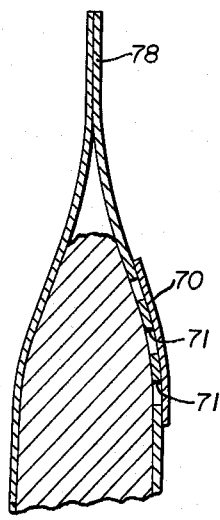
FIGURE 13 is a section, on an enlarged scale, on the line 13—13 of FIGURE 12.

The finished package is shown in FIGURE 12. The tabs 70 cover the perforations 71. Instead of the seams 78 and 79 being perfectly flat, the ends may be plicated by well known mechanism before the heat sealers are brought into contact with the sheet. Each such pillow package is advantageously packaged individually in a suitable cardboard container.

Figure 14:
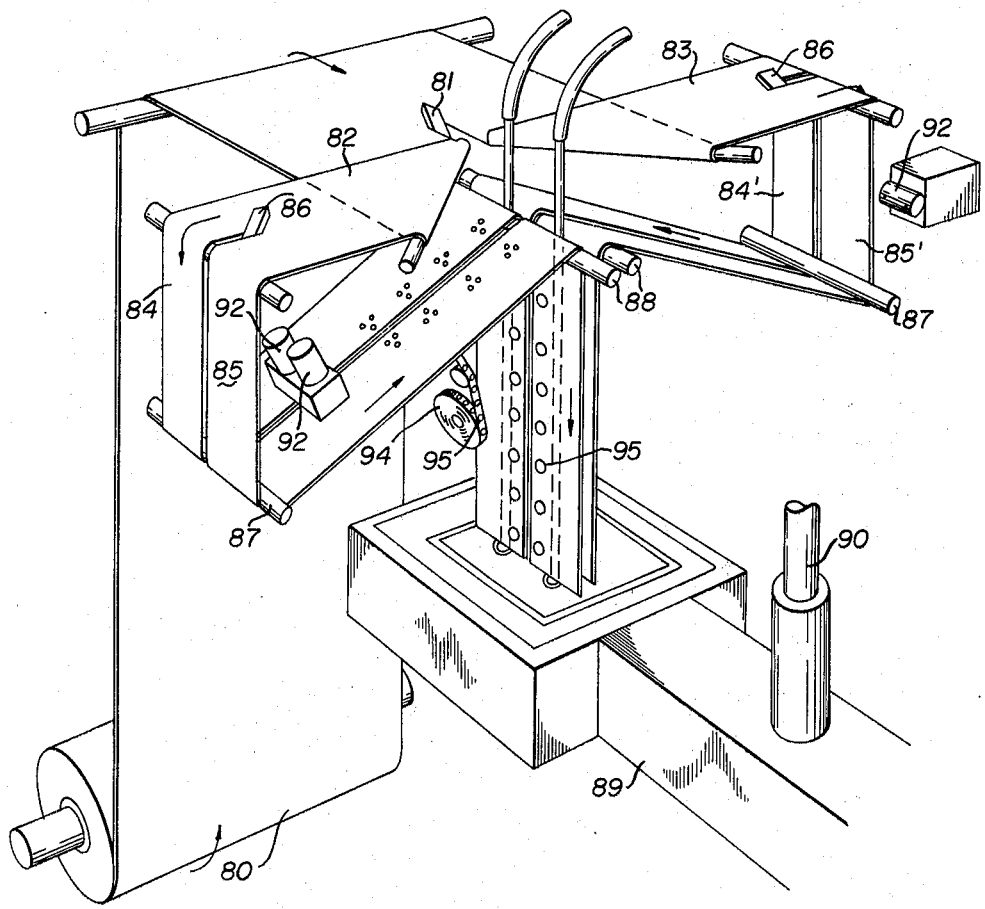
FIGURE 14 is a diagrammatic view of means for producing containers from two sheets of film and filling the same.

FIGURE 14 shows diagrammatically mechanism for forming envelope-type containers from two separate sheets. A wide sheet is delivered from the roll 80 and is cut by the knife 81 into two parts, 82 and 83. Each of these parts is then cut into the two halves 84, and 85, 84' and 85' by the knives 86. The respective final halves are then brought down under guide bars 87 and over guide bars 88, and then with the heat-sealable surfaces of the two halves facing one another they are fed into the sealing and feeding mechanism enclosed in the box 89. The material to be packaged is fed in increments through the pipe 90. Means for sealing the edges and bottoms of the separate sheets is known, as well as mechanism for conveying these envelopes under the feed supply 90. Then the tops of the envelopes are sealed by known means.

The intermittent movement of the sheet is controlled by the electric eye 92 which is focused on a registering mark (not shown) on the sheet, so that the sheet is brought to rest in accurate position at each of the several stations. The two sheets 84 and 85 are perforated by die means 92 while on suitable support means (not shown), and then separate waxed paper strips 94 with the tabs 95 affixed are brought under the separate sheets and the tabs are released and transferred to the sheets 84 and 85 by means such as previously shown and described. (The waste waxed paper from which the tabs have been removed is not shown.)

The equipment and processes, as well as the various packages shown and described in greater detail, are illustrative. The invention is covered in the claims which follow.

What I claim is:

1. The method of making a container from flexible packaging sheet material with opposed heat-sealable areas and filling the container with a free-flowing pourable material, which method comprises supplying the sheet material from at least one roll thereof, shaping the sheet material into a container by heat-sealing together a portion of said heat-sealable areas to form a container open at the top, filling the container with said pourable material and then sealing the top of the container closed by pressing another portion of said areas together with heat to form a heat seal therebetween, and between said steps of supplying the sheet material and filling the container providing at least one perforation in the sheet material to serve as a shaker outlet in a relatively small area of the supplied sheet material, progressively supplying a carrier to which are individually attached a series of small tabs each adapted to cover the perforated area of a small patch and adhering one of said tabs to the outer surface of said area of each pouch by means of a pressure-sensitive adhesive.

2. In the process of making a flat pouch from a flexible packaging sheet material with at least one heat-sealable surface, and filling the pouch with a free-flowing pourable material, in which process the sheet material is supplied from at least one supply roll thereof, and two such surfaces of the supplied sheet material are opposed to one another and the pouch is formed therefrom and the pourable material is flowed into a space between them and then heat-sealed therein, the steps which comprise providing flexible patches adhered to a tape by pressure sensitive adhesive, supplying the sheet material from a roll, and before filling the pouch, forming in the sheet material a shaker outlet comprising at least one opening in a relatively small area of the supplied sheet material by perforating it and then covering this area with a flexible patch by separating the same from the tape by flexing the tape and pressing said pressure sensitive adhesive to the outer surface of the pouch at this area.

References Cited by the Examiner

UNITED STATES PATENTS

| | | | |
|---|---|---|---|
| 506,982 | 10/1893 | Diamond | 222—541 |
| 1,849,159 | 3/1932 | Torrence. | |
| 2,149,713 | 3/1939 | Webber | 53—14 X |
| 2,325,942 | 8/1943 | Drake | 222—107 |
| 2,371,521 | 3/1945 | Heywood et al. | 222—107 |
| 2,776,787 | 1/1957 | Nicol. | |
| 2,779,126 | 1/1957 | Cook | 222—565 |
| 2,878,967 | 3/1959 | Duke | 222—107 |
| 2,993,313 | 7/1961 | Hogan | 53—14 |
| 3,011,293 | 12/1961 | Rado | 53—14 |
| 3,083,876 | 4/1963 | Schneider et al. | 222—107 |

FOREIGN PATENTS 560,381  9/1957  Belgium.

FRANK E. BAILEY, *Primary Examiner.*

RAPHAEL M. LUPO, *Examiner.*